United States Patent [19]

Yoshino

[11] Patent Number: 5,399,953
[45] Date of Patent: Mar. 21, 1995

[54] MOTOR CONTROL AND DRIVE CIRCUIT
[75] Inventor: Motoyasu Yoshino, Kyoto, Japan
[73] Assignee: Rohm Co., Ltd., Kyoto, Japan
[21] Appl. No.: 82,756
[22] Filed: Jun. 25, 1993
[30] Foreign Application Priority Data Jun. 29, 1992 [JP] Japan .................................. 4-194833

[51] Int. Cl.⁶ ............................................ H02P 5/28
[52] U.S. Cl. .................................... 318/799; 318/778;
318/254; 318/138; 318/439
[58] Field of Search ............... 318/799, 798, 778, 254,
318/138, 439

[56] References Cited

U.S. PATENT DOCUMENTS

| | | | |
|---|---|---|---|
| 3,952,237 | 4/1976 | Kimizuka | 318/799 |
| 4,004,205 | 1/1977 | Yamamoto et al. | 318/799 |
| 4,356,437 | 10/1982 | Saito et al. | 318/254 |
| 4,565,956 | 1/1986 | Zimmermann et al. | 318/799 |
| 4,698,577 | 10/1987 | Seymour et al. | 318/799 |
| 4,740,736 | 4/1988 | Sidman et al. | 318/799 |
| 5,212,437 | 5/1993 | Hescht et al. | 318/798 |

Primary Examiner—William M. Shoop, Jr.
Assistant Examiner—Karen Masih
Attorney, Agent, or Firm—Brumbaugh, Graves, Donohue & Raymond

[57] ABSTRACT

A peak level of a drive signal U having predetermined inclination portions is detected, and a detection signal Q is outputted when the peak level has not reached a predetermined value. Since the detection signal Q indicates the out-of-step condition of the motor, the use of the detection signal Q allows reactivation or the like to be triggered easily in a simple circuit. Therefore, the rotation of the motor can be activated by reactivation or the like without strict adjustment but with only a practically adequate adjustment.

5 Claims, 3 Drawing Sheets

MOTOR CONTROL AND DRIVE CIRCUIT

BACKGROUND OF THE INVENTION

1. Field of the Invention

The invention relates to motor control and drive circuits. More particularly, it is directed to a motor control and drive circuit for controlling and driving motors, motor fans and the like while applied to motor controllers such as HDDs, FDDs, optical disk drives and other office automation equipment.

2. Description of the Related Art

FIG. 4 shows a three-phase motor controller in which a motor control and drive circuit is used. Such control and drive circuits have been proposed in U.S. application Ser. No. 07/998,058 and now U.S. Pat. No. 5,319,290.

In FIG. 4, reference numerals 31, 32 and 33 designate comparators; 34, a starter circuit; 40, a trapezoidal wave forming component pulse generation circuit; 41, 42 and 43, a sinusoidal wave approximated trapezoidal wave generation circuit; 44, 45 and 46, drivers; 80, a three-phase motor; and 80a, 80b and 80c, coils of the motor 80.

The comparators 31, 32 and 33 function as a sense circuit. These comparators compare outputs Ua, Va, Wa of the drivers 44, 45, and 46 with a neutral point voltage of the star-connected coils 80a, 80b and 80c to thereby detect a rotating condition of the motor 80. The comparators output detection signals $Ub_2$, $Vb_2$ and $Wb_2$ whose phases are shifted from one another.

The starter circuit 34 has switching circuits SWu, SWv, and SWw. In a steady state, the switch circuits directly output the detection signals $Ub_2$, $Vb_2$, and $Wb_2$ of the comparators 31, 32, 33 as detection signals Ub, Vb, Wb.

The use of a circuit corresponding to the sense circuit allows the rotating condition of the motor to be detected without using Hall elements or the like. It is for this reason that this type of motor is called a "Hall-less motor".

The trapezoidal wave forming component pulse generation circuit 40 generates three sets of trapezoidal wave forming component pulse groups Uc, Vc and Wc from the detection signals Ub, Vb and Wb by causing a gate circuit to perform logical operations. These pulse groups Uc, Vc and Wc are 120° out of phase from one another.

The trapezoidal wave forming component pulse group Uc represents four trapezoidal wave forming component pulses A, B, C and D. The trapezoidal wave forming component pulses A, B, C and D are sequentially outputted in this order without being superposed one upon another. The same applies to the trapezoidal wave forming component pulse groups Vc and Wc.

The sinusoidal wave approximated trapezoidal wave generation circuit 41 generates a trapezoidal wave approximated to a sinusoidal waveform, or a sinusoidal wave approximated trapezoidal wave, in response to the trapezoidal wave forming component pulse group Uc in accordance with timings indicated by the respective component pulses. It is the sinusoidal wave approximated trapezoidal wave that is outputted as a drive signal U.

The driver 44 generates an output Ua having a current waveform following the waveform of the drive signal U by amplification, and outputs such output Ua to the coil 80a.

Similarly, a drive signal V is generated by the sinusoidal wave approximated trapezoidal wave generation circuit 42, and a drive signal W is generated by the sinusoidal wave approximated trapezoidal wave generation circuit 43. The phases of the signals V and W are shifted. The signals Va and Wa as amplified are outputted to the coils 80a and 80b.

Thus, the coils 80a, 80b and 80c are driven by the motor drive currents that moderately vary, thereby ensuring smooth rotation of the motor 80.

Such a Hall-less motor, not requiring that a detector such as a Hall element and an object to be detected being attached thereto, opens the way to downsizing and thinning the motor body, thus making itself requisite in the downsizing of office automation equipment.

The conventional Hall-less motor control and drive circuit feeds back the voltages generated at the coils of the motor in the steady state and generates the drive signal based on the feedback signal to maintain rotation.

However, at the time of starting the motor, voltage serving as the basis for a detection signal has not yet been generated at the coil. Therefore, a starter circuit that operates at the time of starting is required.

The starter circuit 34 generates oscillating signals $Ub_1$, $Vb_1$ and $Wb_1$, which are 120° out of phase from one another upon reception of a starting signal S. During starting, the switching circuits SWu, SWv and SWw are switched to forcibly replace the detection signals Ub, Vb and Wb by these oscillating signals.

In order to accelerate the rotation of the motor from the stop state to a predetermined rotational speed, the oscillating signals $Ub_1$, $Vb_1$ and $Wb_1$ are generated so that the frequencies thereof are gradually increased. Once the predetermined frequencies have been reached, the switching circuits SWu, SWv and SWw are switched to return to the original condition.

When the rotational speed of the motor has been accelerated sufficiently by such operation of the starter circuit, the above-described steady state of the motor can be obtained thereafter by the operation of the feedback loop.

However, such starting control is achieved necessarily by an open loop control, not a control reflecting dynamic conditions of the controlled object such as feedback control. As a result, the setting of the frequencies of the oscillating signals $Ub_1$, $Vb_1$ and $Wb_1$ and the timings at which the switching circuits SWu, SWv and SWw are operated must be adjusted to individual motor characteristics. If the adjustment is inadequate, the motor does not rotate at the time of starting and finds itself in an oscillating condition, or in an out-of-step condition in which local oscillation is repeated. As a result, the adjustment involves a number of steps, which imposes a problem in terms of impairing productivity.

Particularly, the out-of-step condition of the motor is attributable not only to variations in individual motors, but also to the stop condition and environmental conditions (load, temperature, inclination, etc.). The same motor may be subject to this trouble in a very small percentage even though the motor is free from such trouble normally. It is difficult to make proper adjustment of the motor, taking into account these accidental factors and secular changes.

SUMMARY OF THE INVENTION

The invention has been made to overcome these problems encountered by the conventional art. Accordingly, the object of the invention is to achieve a motor control and drive circuit capable of surely activating the rotation of the motor without strict adjustment.

To achieve the above object, the invention is applied to a motor control and drive circuit for rotating a motor, which applies a motor drive current to a coil of the motor, generates a detection signal indicating a rotating condition of the motor from a voltage generated at the coil, generates a drive signal whose waveform corresponds to the detection signal, and outputs the drive signal as the motor drive current by amplifying the waveform of the drive signal. Such motor control and drive circuit includes; a drive signal generation circuit for receiving the detection signal, generating a signal whose waveform has a cycle following a cycle of the detection signal and has an inclination portion at least in part thereof, an inclination of the inclination portion being within a predetermined range, and outputting the thus generated signal as the drive signal; and a circuit for receiving the thus outputted drive signal, detecting a peak level or amplitude value of the drive signal, and comparing the detected value with a predetermined reference value, so that a signal for restarting the motor is generated when an absolute value of the peak value is smaller than the reference value.

The signal for restarting the motor herein used is not limited to signals for directly generating a driving signal within the motor control and drive circuit. This signal includes indirect signals for inducing the generation of a starting signal by other circuits or the like, such as status signals to higher level control circuits and indication signals to operators.

The thus constructed motor control and drive circuit of the invention can detect the peak level or amplitude value of a drive signal, since the drive signal has inclination portions whose inclination is within a predetermined range. The detected value is then compared with a reference value so that a signal for reactivating the motor can be outputted.

This drive signal has a cycle greater than a predetermined time in the steady state or in the normal rotating condition since the rotational speed of the motor has an upper limit. From the fact that the drive signal has the predetermined cycle and has the inclination portions whose inclination is within a predetermined range, it is understood that the drive signal has an amplitude value or peak level exceeding a predetermined value that corresponds to such cycle and inclination.

On the other hand, in the out-of-step state, the motor does not rotate in a predetermined direction, but only oscillates locally, so that the cycle of the drive signal becomes very short. Hence, the inclination of the inclination portions being the same and the cycle being short, the amplitude value or peak level of the drive signal becomes very small.

It is understood from the above that one can judge whether the rotating condition of the motor is normal or oscillating by a signal having detected the amplitude or peak level of the drive signal.

Therefore, even if the rotation of the motor is not activated successfully by the open loop control of the starter circuit, the motor condition can be detected by the signal having detected the peak level or the like. This dispenses with adjustment taking into consideration accidental events that rarely happen, because such abnormality can be taken care of by reactivating the motor automatically or by receiving a reactivation command after an error indication in accordance with a motor reactivation signal.

As a result, the rotation of the motor can be activated surely without strict adjustment.

DETAILED DESCRIPTION OF THE PREFERRED EMBODIMENT

A three-phase motor controller, which is an embodiment of the invention will be described with reference to a block diagram shown in FIG. 1.

Figure 1:
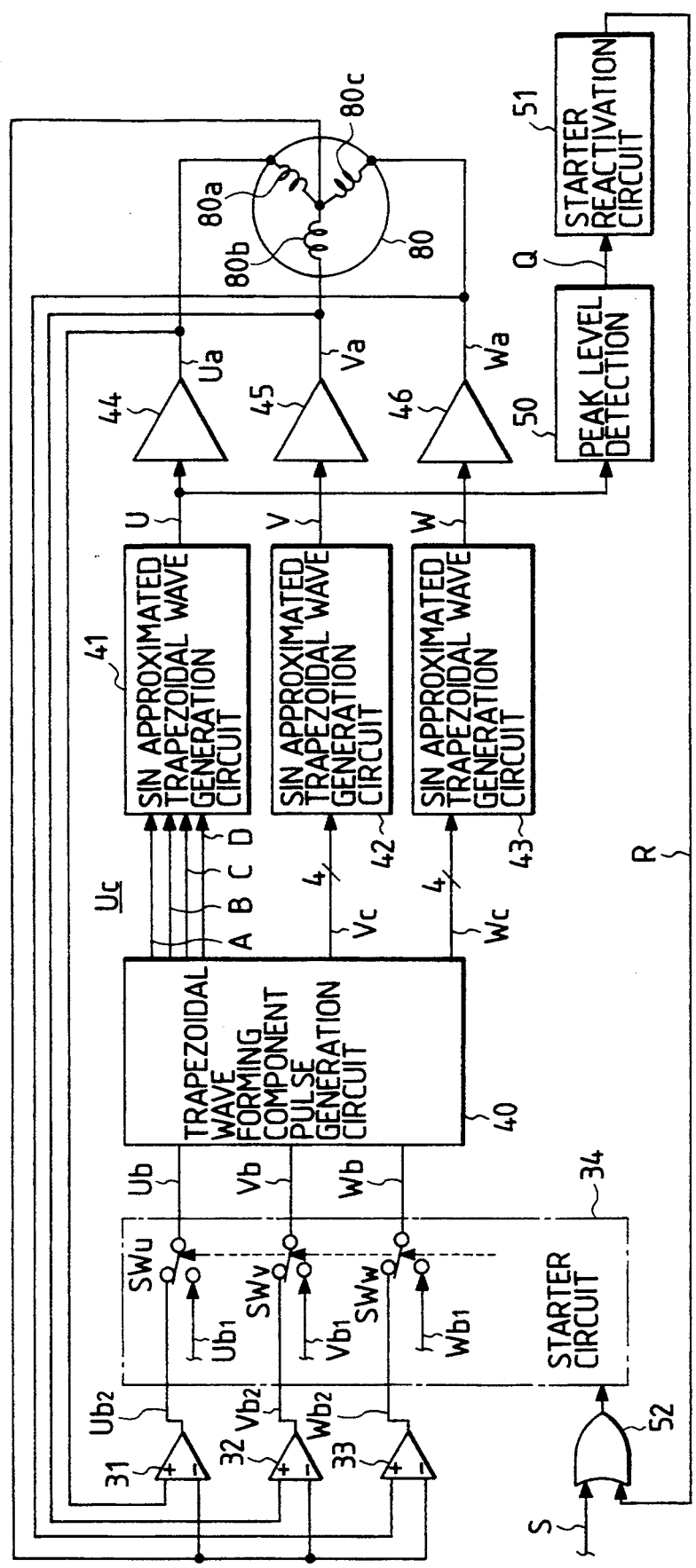
FIG. 1 shows a three-phase motor controller, which is an embodiment of the invention.

In FIG. 1, reference numerals 31, 32 and 33 designate comparators; 34, a starter circuit; 40, a trapezoidal wave forming component pulse generation circuit; 41, 42 and 43, a sinusoidal wave approximated trapezoidal wave generation circuit; 44, 45 and 46, drivers; 50, a peak level detection circuit; 51, a starter reactivation circuit; 52, an OR gate, 80, a three-phase motor; and 80a, 80b and 80c, coils of the motor 80. The trapezoidal wave forming component pulse generation circuit 40 and the sinusoidal wave approximated trapezoidal wave generation circuit 41 constitute a drive signal generation circuit for generating drive signals.

The comparator 31 constitutes a so-called sense circuit. The comparator 31 detects a rotating condition of the motor 80 by comparing a voltage at an output Ua of the driver 44 with a neutral point voltage of the star-connected coils 80a, 80b and 80c, and outputs a binary detection signal $Ub_2$.

The comparators 32 and 33 perform the same operation for the other phases and output detection signals $Vb_2$ and $Wb_2$, which are 120° out of phase from each other.

The starter circuit 34 has switching circuits SWu, SWv and SWw. In a steady state, these switching circuits output the detection signals $Ub_2$, $Vb_2$ and $Wb_2$ from the comparators 31, 32 and 33 merely as detection signals Ub, Vb and Wb.

Since voltages for generating the detection signal $Ub_2$ and the like have not yet been generated at the coils at the time of activation, the starter circuit 34 falsely generates and outputs the detection signals Ub, Vb and Wb.

To do so, the starter circuit 34 generates oscillation signals $Ub_1$, $Vb_1$ and $Wb_1$ which are 120° shifted from one another upon reception of an activation signal S through the OR gate 52. By switching the switching circuit SWu, SWv and SWw so that the oscillation signals $Ub_1$, $Vb_1$ and $Wb_1$ are selected as inputs, instead of the detection signals $Ub_2$, $Vb_2$ and $Wb_2$ during the activation, the detection signals Ub, Vb and Wb are forcibly replaced by these oscillation signals $Ub_1$, $Vb_1$ and $Wb_1$.

The frequencies of these oscillation signals $Ub_1$, $Vb_1$ and $Wb_1$ are generated so as to gradually increase from low to high, whereby the rotation of the motor is accelerated from the stop state to a predetermined rotational speed under open control. When the oscillation signals have reached predetermined frequencies, the switching circuits SWu, SWv and SWw are switched to return the motor to the steady state.

Such operation of the starter circuit allows electromotive force (emf) to be generated at the coils of the motor once the motor has been rotated, and by replacing the signals $Ub_2$, $Vb_2$ and $Wb_2$ produced as a result of having detected the generation of the emf at the coils with the detection signals Ub, Vb and Wb, the motor rotation is brought to the steady state.

The trapezoidal wave forming component pulse generation circuit 40 generates three sets of trapezoidal wave forming component pulse groups Uc, Vc and Wc from the detection signals Ub, Vb and Wb by a logic operation performed by the gate circuit. The trapezoidal wave forming component pulse group Uc relates to the driving of the coil 80a; the trapezoidal wave forming component pulse group Vc relates to the driving of the coil 80b; and the trapezoidal wave forming component pulse group Wc relates to the driving of the coil 80c. These component pulse groups are 120° out of phase from one another.

Since the pulsed detection signals Ub, Vb and Wb no longer contain signal waveform distortions caused by interference from the motor or the like, the trapezoidal wave forming component pulse groups Uc, Vc and Wc generated therefrom are free from signal waveform distortions or the like.

The trapezoidal wave forming component pulse group Uc represents four trapezoidal wave forming component pulses A, B, C, and D. The trapezoidal wave forming component pulses A, B, C and D are outputted in this order in such a manner that they are not superposed on upon another. The trapezoidal wave forming component pulses A and C correspond to a first trapezoidal wave forming component pulse, and the trapezoidal wave forming component pulses B and D correspond to a second trapezoidal wave forming component pulse. Here, the trapezoidal wave forming component pulses A and B are paired to form a positive side trapezoidal wave, whereas the trapezoidal wave forming component pulses C and D are paired to form a negative side trapezoidal wave. The positive and negative waves formed because the motor drive current is driven in two directions; in the case of a single direction driving, either one of the pairs may be employed.

The same applies to the trapezoidal wave forming component pulse groups Vc and Wc.

The sinusoidal wave approximated trapezoidal wave generation circuit 41 forms, first of all, a positive inclination portion upon reception of the trapezoidal wave forming component pulse A, forms a negative inclination portion upon reception of the trapezoidal wave forming component pulse B, and generates a positive sinusoidal wave approximated trapezoidal wave by making portions other than these inclined portions flat. The circuit 41 then forms a negative inclination portion upon reception of the trapezoidal wave forming component pulse C, forms a positive inclination portion upon reception of the trapezoidal wave forming component pulse D, and generates a negative sinusoidal wave approximated trapezoidal wave by making portions other than these inclined portions flat. In this way, a group of trapezoidal wave forming component pulse A, B, C and D is generated for a single pulse of detection signal Ub, whereby a drive signal U having a pair of positive and negative trapezoidal waves as a single cycle is generated.

The driver 44 drives the drive current in two ways, output and input, as a motor drive stage amplifier of the coil 80a. The driver 44 generates an output Ua by amplifying the drive signal U and applies Ua to the coil 80a.

The sinusoidal wave approximated trapezoidal wave generation circuit 42 similarly generates a drive signal V from the trapezoidal wave forming component pulse group Vc, only the phase of the drive signal V being different, and the driver 45 applies an output Va produced by amplifying the drive signal V to the coil 80b. The same applies to the sinusoidal wave approximated trapezoidal waveform generation circuit 43, the driver 46 and the coil 80c.

Accordingly, the coils 80a, 80b and 80c are driven by the moderately varying motor drive current, thus allowing a smooth rotation of the motor 80.

Figure 3:
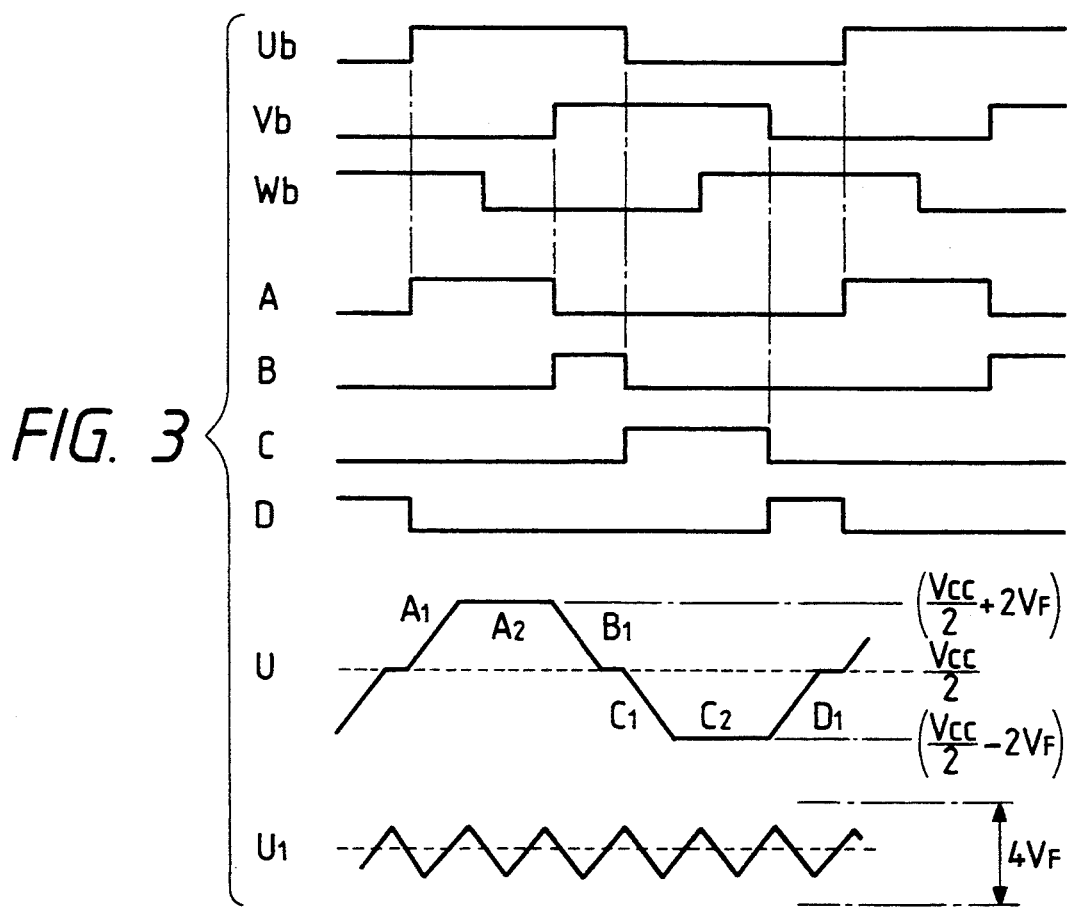
FIG. 3 is a diagram illustrative of exemplary waveforms of signals.
Figure 4:
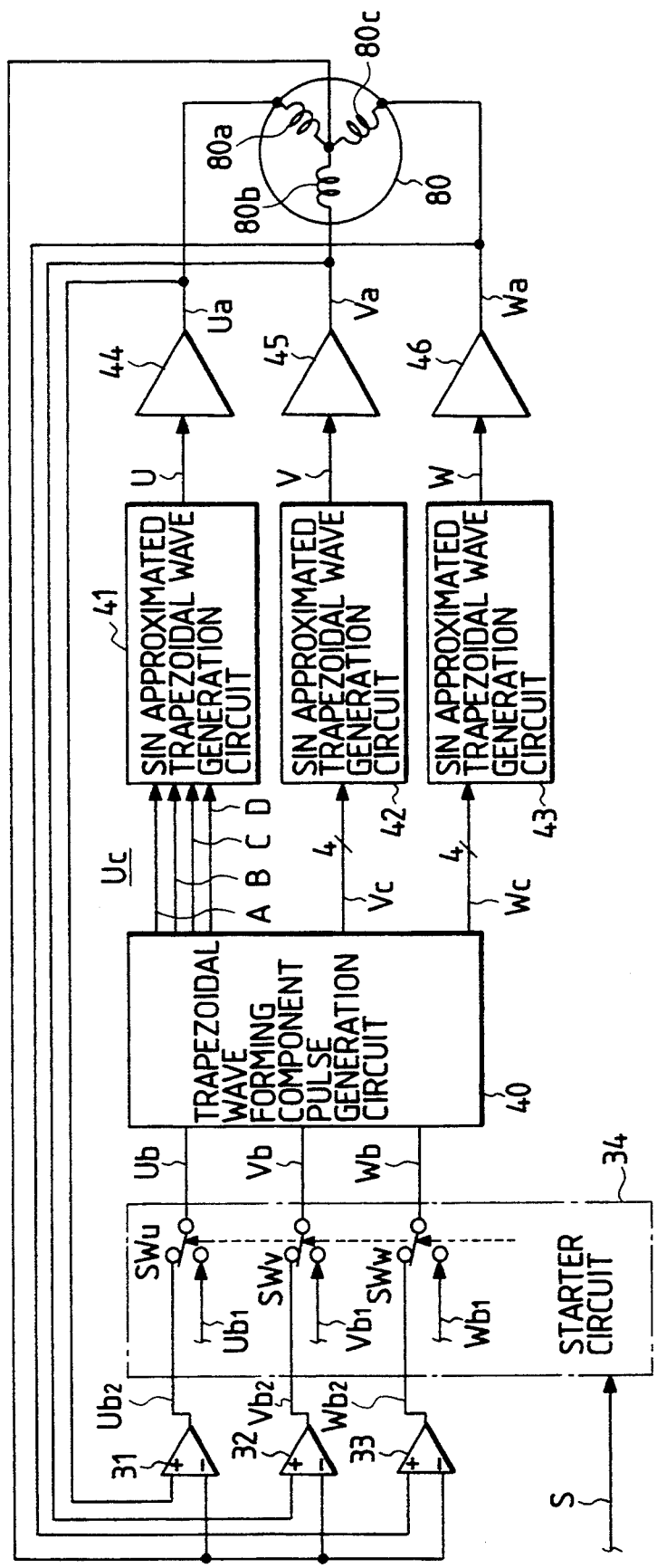
FIG. 4 shows a conventional three-phase motor controller.

Exemplary waveforms are shown in FIG. 3 in order to describe in more detail the operation of the components involved in the drive signal generation circuit. These waveforms will now be described.

The detection signals Ub, Vb and Wb from the sense circuit are signals whose duty ratio is about 50% except for the transient state and there is a 120° phase shift among them (see the waveforms Ub, Vb and Wb shown in FIG. 3).

By taking logical AND of these signals or negative signals thereof at the trapezoidal wave forming component pulse generation circuit 40, a trapezoidal wave forming component pulse A ($=Ub.\overline{Vb}$) that is about first $\frac{2}{3}$ the width of a single pulse of the detection signal Ub, a trapezoidal wave forming component pulse B ($=Ub.Vb$) that is about latter $\frac{1}{3}$ the width of the same, a trapezoidal wave forming component pulse C ($=\overline{Ub}.Vb$) that is about first $\frac{2}{3}$ the width of a low level portion of the detection signal Ub, and a trapezoidal wave forming component pulse D ($=\overline{Ub}.\overline{Vb}$) that is about latter $\frac{1}{3}$ the width of the same are produced (see the waveforms A, B, C and D shown in FIG. 3).

A sinusoidal wave approximated trapezoidal waveform drive signal U having moderately inclined portions is generated by the sinusoidal wave approximated trapezoidal wave generation circuit 41 upon reception of these trapezoidal wave forming component pulses A, B, C and D (see the waveform U shown in FIG. 3).

The output Ua produced by amplifying the drive signal U as well as the similarly produced outputs Va and Wa drive the coils 80a, 80b and 80c of the motor.

It is only when the motor 80 is being rotated normally that such waveform of the drive signal U can be obtained. At the time the motor 80 gets oscillated, i.e., when the motor is being oscillated at short frequencies as if to vibrate within a locally confined small range, there are no timings forming the $A_2$ and $C_2$ portions in the waveform of the drive signal U, thereby forming the waveform of the drive signal U into a triangular or sawtooth wave of a small amplitude such as a waveform $U_1$.

Figure 2:
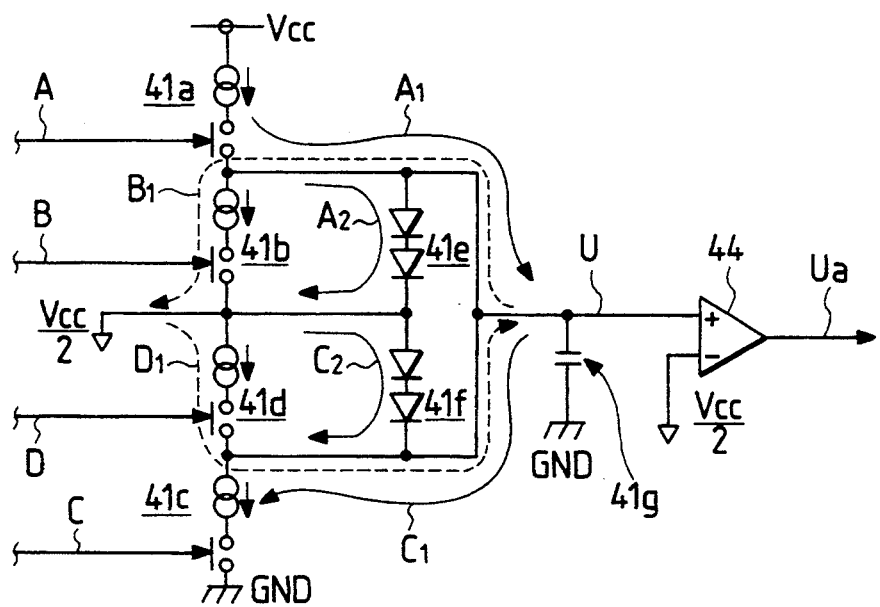
FIG. 2 is a specific example of a sinusoidal wave approximated trapezoidal wave generation circuit of the invention.

A specific example of a configuration of the sinusoidal wave approximated trapezoidal wave generation circuit 41 is shown in FIG. 2. In FIG. 2, reference numerals 41a, 41b, 41c and 41d designate a circuit in which constant-current circuits and switching circuits are connected in series (hereinafter abbreviated as "constant-current switching circuit"); 41e and 41f, a diode circuit in which two diodes are connected in cascade; and 41g, a capacitor.

The constant-current switching circuit 41a is equivalent to a circuit formed of a first constant-current circuit and a first switching circuit. This circuit 41a is interposed between a power source Vcc equivalent to a first reference voltage terminal and a signal line of the drive signal U and outputs a constant current $A_1$ or $A_2$ by causing the corresponding switching circuit to conduct upon reception of the trapezoidal wave forming component pulse A.

The constant-current switching circuit 41b is equivalent to a circuit formed of a second constant-current circuit and a second switching circuit. This circuit 41b is interposed between a terminal (Vcc/2) equivalent to a second reference voltage terminal and the signal line of the drive signal U and outputs a constant current $B_1$ by causing the corresponding switching circuit to conduct upon reception of the trapezoidal wave forming component pulse B.

The constant-current switching circuit 41c is equivalent to a circuit formed of the first constant-current circuit and the first switching circuit. This circuit 41c is interposed between a ground GND equivalent to the first reference voltage and the signal line of the drive signal U and outputs a constant-current $C_1$ or $C_2$ by causing the corresponding switching circuit to conduct upon reception of the trapezoidal wave forming component pulse C.

The constant-current switching circuit 41d is equivalent to a circuit formed of the second constant-current circuit and the second switching circuit. This circuit 41d is interposed between the terminal (Vcc/2) equivalent to the second reference voltage terminal and the signal line of the drive signal U and outputs a constant-current $D_1$ by causing the corresponding switching circuit to conduct upon reception of the trapezoidal wave forming component pulse D.

The diode circuit 41e is connected to the constant-current switching circuit 41b in parallel; and the diode circuit 41f is connected to the constant-current switching circuit 41d in parallel.

The capacitor 41g is inserted between the signal line of the drive signal U and a ground GND equivalent to a third reference voltage terminal and defines the waveform of the drive signal U, which is a voltage signal, while charged and discharged by the constat currents $A_1$, $B_1$, $C_1$ and $D_1$.

The thus configured sinusoidal wave approximated trapezoidal wave generation circuit 41 causes the capacitor 41g to be charged by the constant current $A_1$ through the constant-current switching circuit 41a upon reception of the trapezoidal wave forming component pulse A, so that a positive inclination portion in the voltage waveform for the drive signal U is formed (see a portion $A_1$ of the waveform U shown in FIG. 3). When the voltage of the drive signal U has reached a value (Vcc/2+2VF), the constant current $A_1$ is bypassed as the constant current $A_2$ through the diode circuit 41e. As a result, the voltage waveform of the drive signal U becomes flat (see a portion $A_2$ of the waveform U shown in FIG. 3). Accordingly, the use of the diode circuit 41e gives some allowances in the accuracy of the pulse width of the trapezoidal wave forming component pulse A. If, on the other hand, the pulse width is determined accurately, the diode circuit 41e can be omitted.

Upon reception of the trapezoidal wave forming component pulse B, the capacitor 41g is discharged by the constant current $B_1$ through the constant-current switching circuit 41b, so that a negative inclination portion in the voltage waveform for the drive signal U can be formed (see the first part of a portion $B_1$ of the waveform U shown in FIG. 3). When the voltage of the drive signal U has reached the value (Vcc/2), the voltages across the constant-current switching circuit 41b become equal, having no voltage for driving the constant current $B_1$. As a result, the voltage waveform of the drive signal U becomes flat (see the latter part of the portion $B_1$ of the waveform U shown in FIG. 3).

Accordingly, a single trapezoidal wave can be produced on the upper side of the reference voltage Vcc/2 (positive side).

Similarly, a negative inclination portion in the voltage waveform for the drive signal U (see a portion $C_1$ of the waveform U shown in FIG. 3) and a flat portion contiguous thereto (see a portion $C_2$ of the waveform U shown in FIG. 3) are formed by the constant-current switching circuit 41c and the capacitor 41g upon reception of the trapezoidal wave forming component pulse C. Further, upon reception of the trapezoidal wave forming component pulse D, a positive inclination portion in the voltage waveform for the drive signal U (see the first part of a portion $D_1$ of the waveform U shown in FIG. 3) and a flat portion contiguous thereto (see the latter part of the portion $D_2$ of the waveform U shown in FIG. 3) are formed by discharging through the constant-current switching circuit 41d. Accordingly, another trapezoidal wave is formed on the lower side of the reference voltage Vcc/2 (negative side).

At the steady state, a drive signal U whose peak level (Vcc/2+2VF) having a sine curve approximated wave equivalent to a single cycle is generated by a pair of positive and negative trapezoidal waves thus formed. Since this drive signal U has a signal component whose reference voltage is Vcc/2, the driver 44 amplifies the difference between the drive signal U and the reference voltage Vcc/2 and outputs the bidirectional current Ua.

At the oscillating condition, on the other hand, the charging and discharging current of the capacitor 41g is the same constant current. However, charging and discharging are repeated at a very short cycle, so that the amplitude is less than 4VF, with the peak level thereof not reaching the value (Vcc/2+2VF).

By the way, the peak level detection circuit 50 includes a peak hold circuit and a comparator. Upon reception of the drive signal U (or the drive signal V or W), the circuit 50 holds the peak level of such signal. The circuit 50 further compares a reference comparison voltage whose value is smaller than the peak level at the steady state (Vcc/2+2VF), e.g., a value (Vcc/2+VF) with the peak level thereof and outputs a detection signal Q when the peak level is smaller than the comparison voltage.

The starter reactivation circuit 51 sends a starter signal to a control CPU or the like (not shown) of the motor controller in response to the detection signal Q, resets the motor control and drive circuit and the like, and outputs a reactivation signal R (a signal for reactivating the motor) at an appropriate timing thereafter.

The reactivation signal R is received by the starter circuit 34 through the OR gate 52 as an activation signal, and causes the motor to start rotating again by automatically repeating the above-described activation procedure.

Motor characteristics variations and the like can be adjusted to a level smaller than one failure per 10000 to 20000 activations.

Therefore, there is a very small likelihood that the motor will fail to be reactivated. Such likelihood is almost equal to none. Even if the motor fails to be reactivated, the reactivating operation is repeated.

The above-cited rate of failure imposes no problem in practical operation even if the activation time is a bit prolonged although it rarely happens.

While the oscillating condition of the motor is detected by detecting the peak level of the drive signal in this embodiment, the oscillating state of the motor can be detected by detecting the amplitude value of a drive signal that is equivalent to the peak level.

The motor control and drive circuit that generates a drive signal of the waveform having such predetermined inclination portions such as shown in this embodiment can detect the oscillating condition of the motor easily by monitoring one of the drive signals. Therefore, the detection circuits and the like involved in the motor control and drive circuit can be simple. A motor control circuit not outputting such a drive signal may be expanded by providing a triangular wave generating circuit for generating a triangular wave whose phase is synchronous with the phase of one of the detection signal Ub and the like, the trapezoidal wave forming component pulse A and the like and the drive signal U and the like and by making this triangular wave an input to the peak level detection circuit 50. Further, such triangular wave generating circuit may be replaced by a sawtooth wave generating circuit.

As is understood from the foregoing description, the motor control and drive circuit of the invention can judge whether or not the rotating condition of the motor is normal by detecting the amplitude value or peak level of the drive signal. Therefore, by reactivating the motor, etc., in accordance with the detected condition, the rotation of the motor can surely be activated without strict adjustment. As a result, the adjustment process can be curtailed to a significant degree, and this contributes to improving the productivity.

What is claimed is:

1. A motor control and drive circuit for rotating a motor, which applies a motor drive current to a coil of the motor, generates a detection signal indicating a rotating condition of the motor from a voltage generated at the coil, generates a drive signal whose waveform corresponds to the detection signal, and outputs the drive signal as the motor drive current by amplifying the waveform of the drive signal, comprising:

a sensing circuit for sensing the difference between a drive signal applied to a motor coil and a neutral point to produce a detection signal;

a drive signal generation circuit for generating a signal, in accordance with the detection signal, whose waveform has a cycle following a cycle of the detection signal and has an inclination portion having a predetermined inclination, and outputting the generated signal as the drive signal; and a circuit for receiving the outputted drive signal, detecting at least one of a peak level and amplitude value of the drive signal, comparing the detected value with a predetermined reference value, and generating a signal for reactivating the motor when an absolute value of the peak value is smaller than the reference value.

2. A motor controlling device for controlling a rotation of a motor, comprising:

detecting means for detecting a rotating condition of said motor;

motor driving means for generating a motor driving signal according to the detection signal of said detecting means;

peak detection means for detecting a peak level of the motor driving signal and for generating a failure signal when the peak level is smaller than a predetermined voltage; and starter reactivation means for resetting and reactivating said motor driving means in response to said failure signal.

3. A motor controlling device as claimed in claim 2, wherein said motor is a three-phase motor having three coils which are star-connected, and said detecting means comprises three comparators for comparing each output of coils of the motor with a neutral point voltage.

4. A motor controlling device as claimed in claim 3, wherein said motor driving means comprises a starter circuit which relays the output signals of said comparators in a steady state while said starter circuit generates three oscillation signals which are shifted by 120 degree each upon receiving an activation signal.

5. A motor control and drive circuit for generating, according to a first detection signal corresponding to a voltage to be generated at a coil of a motor, a drive signal having a signal waveform for determining a current waveform to be applied to the coil, comprising:

a sensing circuit for sensing the difference between a drive signal applied to a motor coil and a neutral point to produce a detection signal;

a sawtooth wave generation circuit for receiving a signal having the same cycle as and being synchronous with the detection signal and generating a sawtooth wave signal, the sawtooth wave signal being brought to a predetermined initial value at a timing of inverting the received signal; a peak detection circuit for receiving the sawtooth wave signal and detecting a peak value thereof; and a circuit for receiving the detected peak value and comparing the peak value with a predetermined reference value, so that a signal for reactivating the motor can be generated when an absolute value of the peak value is smaller than the reference value.

* * * * *